United States Patent [19]

Sando et al.

[11] 4,225,309
[45] Sep. 30, 1980

[54] SHRINKAGE SETTING PROCESS FOR CLOTH MATERIAL

[75] Inventors: Yoshikazu Sando; Hiroshi Ishidoshiro, both of Wakayama, Japan

[73] Assignee: Sando Iron Works, Co. Ltd., Wakayama, Japan

[21] Appl. No.: 952,402

[22] Filed: Oct. 18, 1978

[30] Foreign Application Priority Data

Oct. 31, 1977 [JP] Japan .................. 52-130572

[51] Int. Cl.³ ............................... D06P 5/00
[52] U.S. Cl. ........................ 8/148; 8/149.1; 8/149.3; 8/DIG. 15; 8/DIG. 16
[58] Field of Search ............... 8/17, 148, 149.1, 149.3, 8/DIG. 15, DIG. 16

[56] References Cited

U.S. PATENT DOCUMENTS

| 3,094,859 | 6/1963 | Isley et al. | 8/DIG. 16 |
| 3,447,885 | 6/1969 | Hasselkuss et al. | 8/17 |
| 3,885,911 | 5/1975 | Habib | 8/115.6 |
| 4,108,597 | 8/1978 | Mueller et al. | 8/17 |

Primary Examiner—Maurice J. Welsh
Attorney, Agent, or Firm—Toren, McGeady and Stanger

[57] ABSTRACT

A shrinkage setting process for a cloth material carried out by impregnating the cloth material with a caustic liquid or a liquid mixture prepared by mixing auxiliaries in the caustic liquid or with a dyeing liquid. The cloth material is then subjected to a hygro-thermic treatment to shrink or dye the cloth material in a no tension state within a high pressure steamer the inside of which is kept at conditions of high heat and humidity. Following the hygro-thermic treatment, the cloth material is subjected to a no tension boiling treatment carried out with a liquid flow within a boiling tank which is disposed inside the same high pressure steamer. Then, the degree of shrinkage of the cloth material is set by gradually cooling it down to about 50° C. to let the cloth material permanently retain a sufficient degree of stretchability.

2 Claims, 1 Drawing Figure

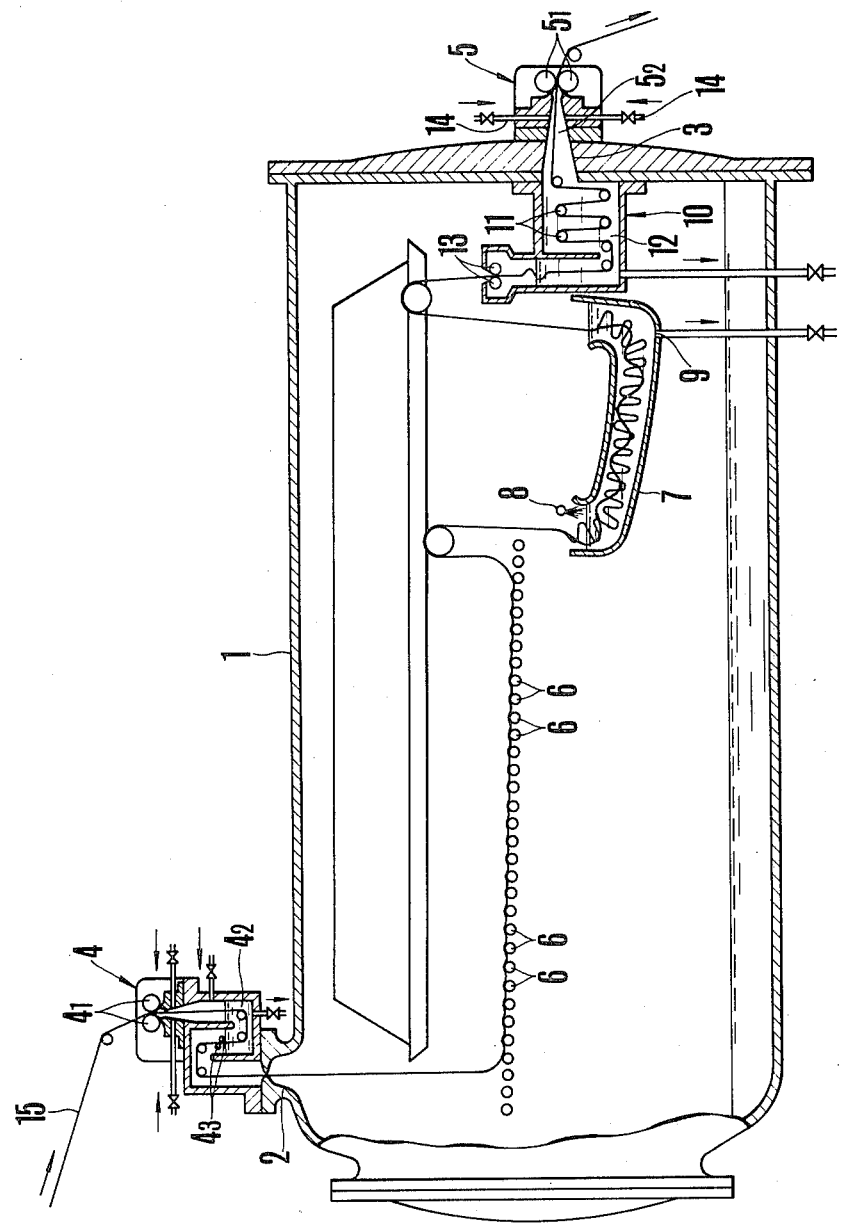

ent by the present invention has proved that the process can provide a cloth material with a stable stretchability of a high degree.
SHRINKAGE SETTING PROCESS FOR CLOTH MATERIAL

BACKGROUND OF THE INVENTION

1. Field of the Invention

This invention relates to a shrinkage setting process for causing a cloth material to retain a sufficient degree of stretchability.

2. Description of the Prior Art

Heretofore the shrinkage setting process for cloth material has been carried out by immersing the cloth material in a liquid resin to impregnate it with the liquid resin to cause it to retain stretchability. However, permanent stretchability could not be expected from the conventional shrinkage setting process carried out with a liquid resin. The resin gradually comes off the cloth obtained from this process as the cloth is repeatedly washed and the cloth is eventually stretched out completely losing its stretchability. Thus, in accordance with the conventional method, the stretchability of a cloth material is obtainable only temporarily. Besides, the use of a liquid resin for such a purpose causes an increase in the processing cost. The present invention is directed to the solution of these problems encountered with the conventional method.

SUMMARY OF THE INVENTION

It is therefore an object of the present invention to provide a shrinkage setting process for a cloth material in which, the fibers of the cloth material are caused to shrink by means of a high humid heat without using any liquid resin and the shrunk cloth material is subjected to a heat setting treatment to allow it to permanently retain the same degree of shrinkage and to have stable stretchability.

The above and other related objects and features of the invention will become more apparent from the following description of a preferred embodiment thereof taken in connection with the accompanying drawing.

BRIEF DESCRIPTION OF THE DRAWING

The accompanying drawing is a sectional view showing an apparatus for carrying out the process of the present invention as embodiment example thereof.

DETAILED DESCRIPTION OF PREFERRED EMBODIMENT

A reference numeral 1 indicates a high pressure steamer drum body adapted for treatment of a cloth material under a high pressure humid heat. The steamer drum body 1 is provided with a cloth material inlet port 2 and a cloth material outlet port 3. There are arranged an entrance seal mechanism 4 and an exit seal mechanism 5 respectively at the inlet and outlet ports 2 and 3 to permit entrance and exit of the cloth material therethrough while keeping the high humid heat inside the high pressure steamer drum body 1. The seal mechanism 4 which is disposed on the entrance side of the drum body comprises a pair of seal rubber rolls, a liquid seal tank $4_2$ and wringer rolls $4_3$. The liquid seal tank and wringer rolls are disposed closer to the inlet port 2 than the seal rubber rolls. The other seal mechanism 5 which is disposed on the exit side of the drum body 1 comprises a pair of seal rubber rolls $5_1$ which are in pressed contact with each other and a liquid seal tank $5_2$ which is disposed closer to the outlet port 3 than the seal rubber rolls $5_1$.

A group of rolls 6 are arranged in a row within a fore half portion of the inside of the steamer drum body 1 to convey the cloth material in a no tension state. Each of the rolls 6 is provided with a driving mechanism which rotates the roll at a predetermined speed. Following the group of rolls 6, a boiling tank 7 is disposed inside the same high pressure steamer drum body 1. The boiling tank 7 is provided with a water supply port 8 which is disposed in the vicinity of a cloth material supply port of the boiling tank 7 and a drain hole 9 which is disposed in the bottom of the cloth material outlet part of the boiling tank 7. Between the boiling tank 7 and the cloth material outlet port 3 of the steamer drum body 1, there is provided a slow cooling tank 10. The slow cooling tank is provided with a cloth material passage 12 in which guide rolls 11 are arranged to guide the cloth material in a zigzag manner. The outlet of the cloth material passage 12 is arranged to lead to the cloth material outlet port 3 of the drum body 1. A reference numeral 13 indicates gapped rolls disposed on the entrance side of the cloth material passage 12; and 14 indicates a water supply port provided for water supply to the passage 12. The apparatus described in the foregoing operates in the following manner:

The steamer drum body is first arranged to keep the inside thereof at a high humid heat of 120° C. to 150° C. The liquid seal tank $4_2$ is filled, for example, with a caustic liquid or a dyeing liquid. The boiling tank 7 and the slow cooling tank 10 are arranged to be constantly supplied with water. The boiling tank 7 is also arranged to have a liquid flow therethrough by the constant water supply while the water temperature at the outlet part of the slow cooling tank 10 is arranged not to exceed 50° C.

Upon completion of the above stated preparation, a cloth material 15 which is, for example, a blended yarn fabric consisting of polyester and cotton is passed through the seal mechanism 4 on the entrance side of the steamer drum body 1 and then is immersed in the caustic liquid or a dyeing liquid contained in the liquid seal tank $4_2$. The amount of the caustic liquid with which the cloth material 15 is impregnated is then adjusted to a desired degree through the wringer rolls before the cloth material 15 enters the inside of the steamer drum body 1. Inside the drum body 1, the cloth material 15 is placed on the group of guide rolls 6 which are being driven. While the cloth material 15 is thus being conveyed by these guide rolls 6, the high pressure humid heat maintained within the steamer drum body 1 acts on the cloth material 15 to give a steaming treatment thereto. Then, a reaction of the caustic liquid to this high pressure humid heat causes the cloth material 15 to shrink. The shrunk cloth material 15 is supplied to the inside of the boiling tank 7. In the boiling tank 7, the cloth material 15 is immersed in the flowing water contained therein and is gradually moved forward by the flow of the water within the boiling tank 7. While the cloth material 15 is moving inside the boiling tank 7 in this manner, the cloth material is subjected to a secondary hygro-thermic treatment and, at the same time, the caustic liquid with which the cloth material is impregnated is washed away.

The cloth material 15 is then supplied to the inside of the slow cooling tank 10 where the cloth material which has been heated is gradually cooled down to about 50° C. to have the shrinkage of the cloth material set within the slow cooling tank 10. With the shrinkage thereof having been set, the cloth material is guided to the outside of the steamer drum body through the seal rubber rolls 5₁.

As described in the foregoing, in accordance with the invented process, the cloth material is thoroughly shrunk by the high humid heat within the high pressure steamer drum body and the setting of the cloth material is effected upon completion of a shrinking process, so that the cloth material can be processed to have excellent stretchability. Further, the cloth material which has undergone the high humid heat is not only capable of permanently retaining the desired stretchability but also has a good crease resistance and a good texture.

The concentration of the caustic liquid and the temperature of the inside of the steamer may be set at suitable values in accordance with the kind of the cloth material to be processed and the processing speed. Further, a suitable auxiliary or auxiliaries may be mixed in the above stated caustic liquid in the same manner as well known to those skilled in the art.

What is claimed is:

1. A shrinkage setting process for a cloth material wherein the cloth material is impregnated with a liquid selected from the group consisting of a caustic liquid, a liquid mixture prepared by mixing auxiliaries in a caustic liquid and a dyeing liquid, subjecting the impregnated cloth material to a hygrothermic treatment in a no tension state within a high pressure steamer the inside of which is kept at a high humid heat to shrink or dye the cloth material, then subjecting the cloth to a no tension boiling treatment carried out with a liquid flow within a boiling tank which is disposed inside the high pressure steamer; and then setting the degree of shrinkage of the cloth material by gradually cooling it to about 50° C.

2. The method of claim 1 wherein the temperature of the steam is between about 120° to 150° C.